(No Model.)
S. H. SHORT.
ARMATURE FOR DYNAMO ELECTRIC MACHINES.
No. 462,882. Patented Nov. 10, 1891.
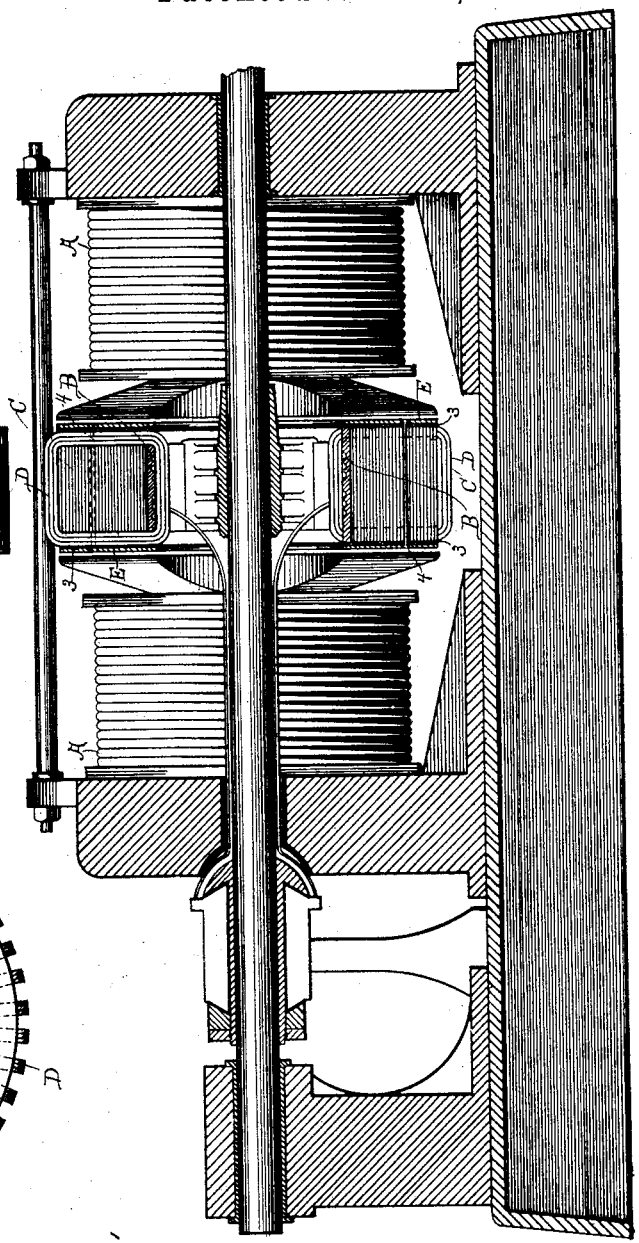
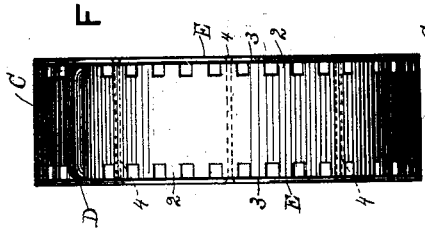
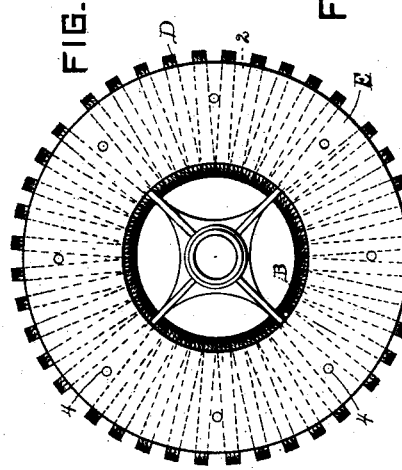
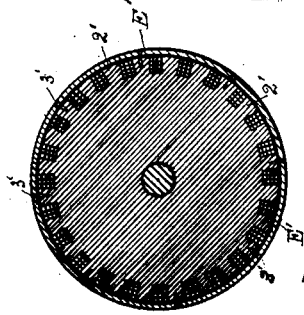
Witnesses
R. E. Auld.
G. F. Downing
Inventor
Sidney H. Short
By H. A. Seymour
Atty.

UNITED STATES PATENT OFFICE.

SIDNEY H. SHORT, OF CLEVELAND, OHIO.

ARMATURE FOR DYNAMO-ELECTRIC MACHINES.

SPECIFICATION forming part of Letters Patent No. 462,882, dated November 10, 1891.

Application filed June 19, 1891. Serial No. 396,819. (No model.)

*To all whom it may concern:*

Be it known that I, SIDNEY H. SHORT, of Cleveland, in the county of Cuyahoga and State of Ohio, have invented certain new and useful Improvements in Armatures for Dynamo-Electric Machines; and I do hereby declare the following to be a full, clear, and exact description of the invention, such as will enable others skilled in the art to which it appertains to make and use the same.

This invention relates more particularly to toothed armatures for dynamo-electric machines for use as generators or as motors—that is to say, to armatures in which the bobbins of insulated wire are separated from each other by teeth or separators; but each of the improvements is included for all the uses to which it is adapted.

Heretofore it has been customary in toothed armatures to form the teeth from the metal of the core. As these teeth, being magnetic, pass through the field, they carry with them the lines of force until these are released under the superior attraction of a succeeding tooth. The result is a disturbance of the field, which (particularly in generators) tends to cause a sparking at the brushes. In accordance with the first part of the present invention the armature is provided with a magnetic bridge between the said teeth, so that the lines of force will not be carried along to the like extent by the said teeth. It is most convenient to form this bridge of a flat ring, and in the case of a laminated core, in order that such ring may not establish circuits for eddy-currents, it is insulated from the teeth. The insulated ring or rings may also be used with a solid core. The teeth may be of any suitable form and construction. They may, for example, extend entirely across the face or faces of the armature, as has been the custom heretofore, or only partly across, as described in a concurrent application of mine for patent, Serial No. 397,368.

In electric machines, particularly the propelling-motors of electric cars, there is a liability of the armature striking against the field-poles. In accordance with the second part of this invention a continuous protector or ring is provided on the ends of the teeth or separators between the bobbins, so as to make contact with the poles, (should occasion arise,) and thus protect the bobbins. So far as this feature is concerned neither the rings or protectors nor the teeth or separators need to be magnetic; but practically they are made of magnetic material, the continuous protector being constituted by the same ring which constitutes the magnetic bridge hereinbefore referred to. Apart from the function of lessening the disturbance caused by the passage through the field of the magnetic teeth or separators between the bobbins, the use of magnetic material for the ring outside the bobbins has the advantage of lessening the resistance of the magnetic circuit. It is possible, also, to use such ring on a close-wound armature or armature without teeth or separators. The invention extends generally to an armature provided with a continuous bobbin-protector, and includes the use of the same on a close-wound as well as on a toothed armature.

The invention further comprises such other constructions, combinations, and arrangements of parts as are herein particularly pointed out.

In the accompanying drawings, which form part of this specification, Figure I is a central longitudinal section of a dynamo-electrical machine provided with a toothed armature in accordance with the invention. Fig. II is a face view of the armature. Fig. III is a plan or edge view of the same without the bobbins, and Fig. IV is a cross-section of a drum-armature, also within the invention.

In the form of machine shown in Figs. I to III the field-magnets A are presented to the sides of the armature. The armature comprises a foundation-ring B and a laminated body C, composed of soft-iron ribbon wound upon itself and slotted to leave teeth 2. In the slots between the teeth the bobbins D are wound. Outside the bobbins D the ring E, of magnetic material, (soft iron,) is secured, with insulation 3 interposed. The rings are held in place by rivets 4, which pass through the armature. In order to avoid the formation of eddy-currents without requiring the rivets to be insulated, a single row of rivets is used at the same distance from the center, so as to bring them on a line of equipotential.

In operation the disturbing effect of the teeth 2 upon the field is lessened by the action of the rings E, which themselves form paths of small resistance to the lines of magnetic force, so that these are not carried along by the teeth to the like extent, as in the ordinary toothed armature, but are conducted gradually back to the succeeding teeth by the rings E acting as magnetic bridges between the teeth. Should the armature come against the poles of magnets A, the contact is made with a ring E, which then constitutes a continuous protector to the armature-bobbins. Owing to the insulation 3 the rings E do not destroy the effects of the lamination of the armature-core.

In Fig. IV a drum-armature for use with poles to be presented to the periphery is shown. It is provided with the ring E', of magnetic material, insulated from the teeth 2', which are formed integral with the plates composing the laminated body of the armature-core. The ring E' has the double function of a continuous bobbin-protector and a lessener of the magnetic disturbance caused by the teeth 2'. It does not destroy the effect of the lamination of the core, being insulated from the teeth. The single row of rivets or screws 3' hold the ring in place.

Having fully described my invention, what I claim as new, and desire to secure by Letters Patent, is—

1. A ring-armature comprising a laminated core slotted at its opposite edges, forming teeth, bobbins wound between the teeth, and flat magnetic rings secured to the sides of the armature outside of the bobbins, substantially as set forth.

2. A toothed armature for a dynamo-electrical machine provided with a flat ring of magnetic material at the ends of the magnetic teeth or bobbin-separators and insulated electrically from said teeth or separators, substantially as described.

3. A laminated armature for a dynamo-electrical machine provided with a magnetic bridge between the magnetic teeth or bobbin-separators electrically insulated from said teeth or separators, substantially as described.

4. An armature for a dynamo-electrical machine, comprising a laminated toothed core of ribbon wound upon itself and slotted at the edges, bobbins between the teeth so formed, and flat magnetic rings on opposite sides of the armature outside the bobbins and insulated from the said teeth, substantially as described.

5. An armature for a dynamo-electrical machine, comprising a laminated core and a flat metal ring or rings outside the bobbins secured in place by a single row of bare rivets arranged in a line of equipotential, substantially as described.

In testimony whereof I have signed this specification in the presence of two subscribing witnesses.

SIDNEY H. SHORT.

Witnesses:
JOHN C. DOLPH,
J. H. GIBSON.